(12) United States Patent
Glanville et al.

(10) Patent No.: US 9,174,164 B2
(45) Date of Patent: Nov. 3, 2015

(54) APPARATUS FOR DEHUMIDIFYING GAS AND METHODS OF USE

(71) Applicants: Paul Eric Glanville, Chicago, IL (US); Yaroslav Chudnovsky, Skokie, IL (US); Qinbai Fan, Chicago, IL (US); Aleksandr Pavlovich Kozlov, Buffalo Grove, IL (US); Mark Jacob Khinkis, Morton Grove, IL (US)

(72) Inventors: Paul Eric Glanville, Chicago, IL (US); Yaroslav Chudnovsky, Skokie, IL (US); Qinbai Fan, Chicago, IL (US); Aleksandr Pavlovich Kozlov, Buffalo Grove, IL (US); Mark Jacob Khinkis, Morton Grove, IL (US)

(73) Assignee: Gas Technology Institute, Des Plaines, IL (US)

( * ) Notice: Subject to any disclaimer, the term of this patent is extended or adjusted under 35 U.S.C. 154(b) by 69 days.

(21) Appl. No.: 14/143,146

(22) Filed: Dec. 30, 2013

(65) Prior Publication Data

US 2015/0182909 A1    Jul. 2, 2015

(51) Int. Cl.
*B01D 53/22* (2006.01)
*B01D 53/26* (2006.01)
*B01D 69/14* (2006.01)
*B01D 71/10* (2006.01)

(52) U.S. Cl.
CPC ............ *B01D 53/268* (2013.01); *B01D 69/147* (2013.01); *B01D 71/10* (2013.01)

(58) Field of Classification Search
CPC .... B01D 53/268; B01D 69/10; B01D 69/147; B01D 71/10; B01D 71/12
USPC .......................................... 96/4, 11, 14; 95/52
See application file for complete search history.

(56) References Cited

U.S. PATENT DOCUMENTS

| | | | |
|---|---|---|---|
| 4,725,359 A * | 2/1988 | Ray | 210/640 |
| 6,277,483 B1 * | 8/2001 | Peinemann et al. | 428/319.3 |
| 6,432,169 B1 * | 8/2002 | Kluwe et al. | 95/52 |
| 6,517,607 B2 | 2/2003 | Rabovitser et al. | |
| 6,539,731 B2 | 4/2003 | Kesten et al. | |
| 6,579,341 B2 * | 6/2003 | Baker et al. | 95/52 |
| 6,581,402 B2 | 6/2003 | Maisotsenko et al. | |
| 6,635,104 B2 * | 10/2003 | Komkova et al. | 96/4 |
| 6,854,278 B2 | 2/2005 | Maisotsenko et al. | |
| 6,887,303 B2 | 5/2005 | Hesse et al. | |
| 7,510,174 B2 | 3/2009 | Kammerzell | |
| 2004/0099140 A1 * | 5/2004 | Hesse et al. | 96/8 |
| 2010/0190093 A1 * | 7/2010 | Lee | 429/516 |
| 2011/0174003 A1 | 7/2011 | Wenger | |
| 2011/0247353 A1 * | 10/2011 | Metz | 62/291 |
| 2012/0118145 A1 * | 5/2012 | Claridge et al. | 95/52 |
| 2013/0298766 A1 * | 11/2013 | Ehrenberg et al. | 95/52 |
| 2014/0150481 A1 * | 6/2014 | Vandermeulen | 62/94 |
| 2014/0305788 A1 * | 10/2014 | Matsushima | 203/10 |
| 2014/0319706 A1 * | 10/2014 | Huizing et al. | 261/102 |
| 2014/0340842 A1 * | 11/2014 | Towner et al. | 361/679.48 |

OTHER PUBLICATIONS

He, S. et al., "Pre-cooling with Munters media to improve the performance of Natural Draft Dry Cooling Towers", Applied Thermal Engineering, 2013, v. 53, pp. 67-77 (11 pages).

(Continued)

*Primary Examiner* — Jason M Greene
(74) *Attorney, Agent, or Firm* — Pauley Erickson & Kottis

(57) ABSTRACT

An apparatus for dehumidifying gas is provided which converts humid gas into dehumidified gas using a hydrophilic membrane that includes a superabsorbent polymer. A sub-dew point cooling tower, sub-dew point evaporative cooler and sub-dew point water harvesting system which utilize the apparatus for dehumidifying gas are also provided.

20 Claims, 4 Drawing Sheets

(56) References Cited

OTHER PUBLICATIONS

Pettersen, S., "Investigation on an Open Cycle Water Chiller based on Desiccant Dehumidification", Norwegian Univ. of Science & Technology—Trondheim, Aug. 2012, Trondheim, Norway, 111 pages.

Pettersen, S. et al., "Investigation on an Open Cycle Water Chiller based on Desiccant Dehumidification", Norwegian Univ. of Science & Technology and Shanghai Jiao Tong University (16 pages).

Xie, X. et al. "An indirect evaporative chiller", Front. Energy Power Eng. China, 2010, v. 4(1), pp. 66-76 (11 pages).

* cited by examiner

APPARATUS FOR DEHUMIDIFYING GAS AND METHODS OF USE

FIELD OF THE INVENTION

This invention is directed to an apparatus for dehumidifying gas for the purpose of enhanced cooling and a sub-dew point cooling tower, indirect regenerative evaporative cooler, and water harvesting system that embody the same.

BACKGROUND OF THE INVENTION

Dehumidifying devices haven used in a variety of application including air conditioners, cooling towers and the like. One kind of dehumidifying apparatus includes a hydrophilic membrane. When humid gas is passed across the hydrophilic membrane, the membrane absorbs moisture from the humid gas, yielding dehumidified gas. The dehumidified gas can then be used for the various cooling applications.

Dehumidification of the gas depresses its dew point temperature. The amount of dehumidification, and thus the depression of dew point, are dependent upon the flow rate of the humid gas and the absorption capacity and permeability of the hydrophilic membrane. If the absorption capacity and rate of the hydrophilic membrane are increased, then the dehumidification of the humid air stream and/or its flow rate can also be increased. There is a need or desire for dehumidification apparatus which provides better water absorption and dehumidification of humid air for enhanced cooling.

SUMMARY OF THE INVENTION

The present invention is directed to an apparatus for dehumidifying gas. The apparatus includes an inlet for receiving humid gas; an internal hydrophilic membrane including a superabsorbent polymer; a flow path for passing the humid gas across the internal hydrophilic membrane, wherein the membrane absorbs moisture from the humid gas to yield dehumidified gas; and an outlet for the dehumidified gas. The superabsorbent polymer provides the hydrophilic membrane with a high absorbent capacity and rate, enabling greater dehumidification and dew point reduction of the gas and/or higher flow rate for the gas.

The invention is also directed to a sub-dew point cooling tower, a sub-dew point evaporative cooler and a sub-dew point water harvesting system, all of which embody the apparatus for dehumidifying gas. Because of the improved dew point depression of the dehumidified gas, its capacity for cooling is significantly improved.

The foregoing and other features and advantages of the invention will become further apparent from the following detailed description of the invention, read in conjunction with the accompanying drawings.

DETAILED DESCRIPTION OF THE INVENTION

Figure 1:
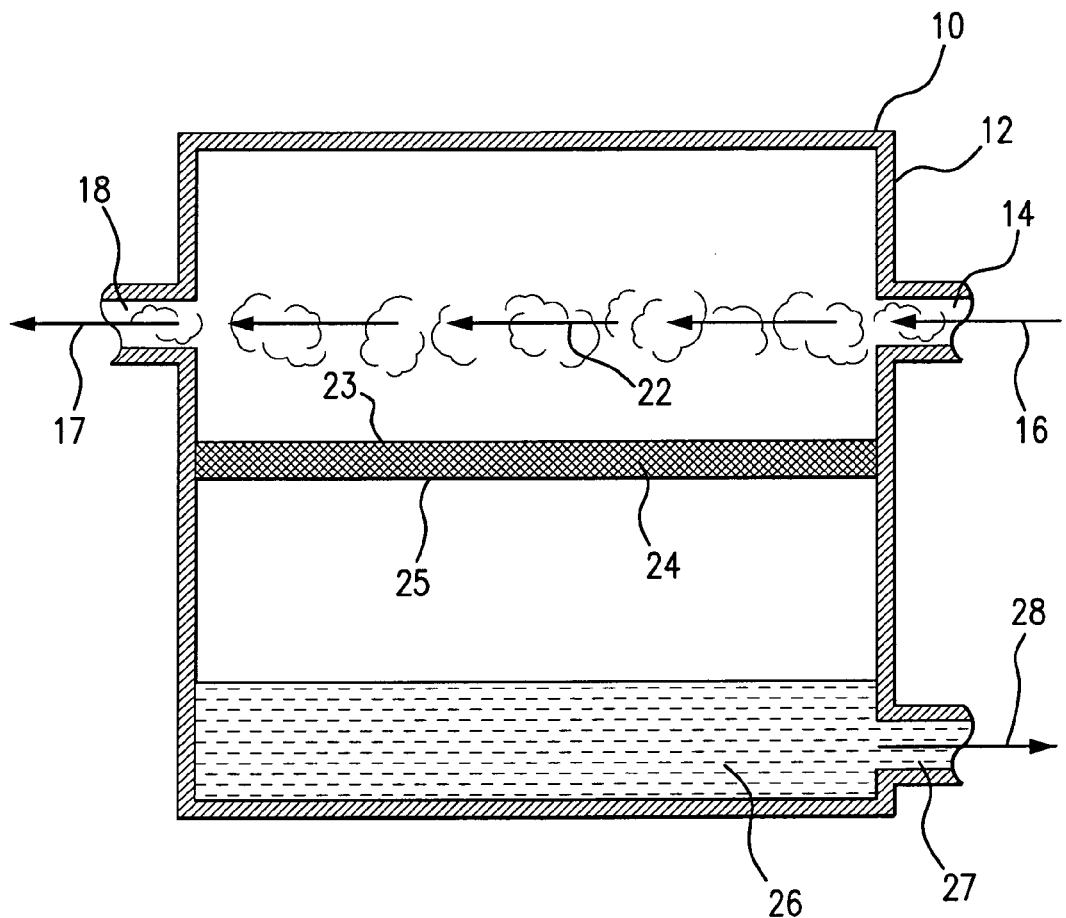
FIG. 1 schematically illustrates an apparatus for dehumidifying gas according to the invention.

FIG. 1 schematically illustrates an apparatus 10 for dehumidifying gas. The apparatus 10 includes an enclosure 12 having an inlet 14 for receiving a stream 16 of humid gas (such as air) and an outlet 18 for discharging a stream 17 (confluent with the stream 16) of dehumidified gas. A flow path 22 carries the stream 16 of humid gas across an upper surface 23 of an internal hydrophilic membrane 24 which, in the embodiment shown, extends from one side to the other of enclosure 12. As the stream 16 passes across the hydrophilic membrane 24 the humid gas is dehumidified, progressively converting the stream 16 into the confluent stream 17 of dehumidified gas. The dehumidified gas passes through the outlet 18 for further processing and use.

The hydrophilic membrane 24 absorbs moisture from the humid gas and ultimately reaches a steady state water content and a steady state absorption/desorption rate. Water passes through the hydrophilic membrane 24 and is discharged through the lower surface 25 into a water basin 26 located in the enclosure 12 below the hydrophilic membrane 24, typically at the bottom of enclosure 12. When the hydrophilic membrane 24 reaches the steady state absorption/desorption rate, the rate of water absorption at the upper surface 23 equals the rate of water release from the lower surface 25. As the basin 26 collects water, the water is discharged through an outlet 27 and forms an exit water stream 28, which can be processed and used further.

The internal hydrophilic membrane 24 includes a superabsorbent polymer. The hydrophilic membrane 24 typically includes a hydrophilic base material upon which the superabsorbent polymer is disposed, so that the combination of hydrophilic base material and superabsorbent polymer forms the hydrophilic membrane.

Superabsorbent polymers are polymers that can absorb very large amounts of water relative to their own mass. Superabsorbent polymers can absorb water in an amount from about 40 to about 800 times their own weight, commonly from about 100 to about 500 times their own weight. The superabsorbent polymer can be selected from natural, synthetic, and modified natural polymers. Examples of natural and modified natural superabsorbent polymers include without limitation hydrolyzed acrylonitrile-grafted starch, acrylic acid grafted starch, methyl cellulose, chitosan, carboxymethyl cellulose, hydroxypropyl cellulose, and natural gums such as alginates, xantham gum, locust bean gum and the like. Examples of synthetic superabsorbent polymers include without limitation alkali metal and ammonium salts of polyacrylic acid, polymethacrylic acid, polyacrylamides, polyvinyl ethers, hydrolyzed maleic anhydride copolymers with vinyl ethers and alpha olefins, polyvinyl pyrrolidone, polyvinyl morpholinone, polyvinyl alcohol or basic or chloride and hydroxide salts of polyvinyl amine, polyquaternary ammonium polyamine, hydrolyzed polyamide, and mixtures and copolymers thereof. These superabsorbent polymers can be crosslinked or partially crosslinked to optimize their absorption rate and capacity, or their contribution to the absorption rate and capacity of the hydrophilic membrane 24.

The superabsorbent polymer can include a zeolite. Zeolites are microporous aluminosilicate materials having a porous structure that can accommodate a wide variety of cations. Examples of mineral zeolites include analcime, chabazite, clinoptilolite, heuldanite, natrolite, phillipsite, and stilbite. Zeolites can be combined with superabsorbent polymers to form composites having both the highly absorbent properties of a superabsorbent and the ion exchange properties of a zeolite. The ion exchange properties help eliminate odors, bacteria and other unwanted substances from the air conditioner water used for evaporative cooling. For example, the zeolites can be combined with any of the foregoing synthetic superabsorbent polymers, suitably during synthesis and/or cross linking of the superabsorbent polymer, using known methods.

The hydrophilic base material can be selected from a wide variety of hydrophilic materials having wicking properties irrespective of the superabsorbent polymer, that are enhanced by the superabsorbent polymer. Suitable hydrophilic base materials include without limitation Manila paper, filter paper, and other cellulose materials. Cloth-like fabrics made from cotton and the like can also be used as the hydrophilic base material. The superabsorbent polymer can be applied to the hydrophilic base material by dipping, soaking, painting (brush coating), spray coating or the like. For example, the hydrophilic base material can be dipped or soaked in a solution containing the superabsorbent polymer. One exemplary solution includes isopropyl alcohol and water in a ratio of about 30-70 parts by weight isopropyl alcohol to about 30-70 parts by weight water, based on a combined 100 parts by weight isopropyl alcohol and water. A particularly suitable ratio is about 33 parts by weight isopropyl alcohol to about 67 parts by weight water. Other solvents and solvent combinations may also be employed.

The hydrophilic base material can have a thickness of about 100 to about 500 microns, suitably about 300 to about 400 microns. The superabsorbent polymer can have a dry coating thickness of about 5 to about 500 microns, suitably about 20 to about 100 microns. The overall hydrophilic membrane 24 can have a dry thickness of about 1 to about 50 microns, suitably about 10 to about 25 microns. The loading of the superabsorbent polymer onto the hydrophilic base material can range from about 0.3 to about 10 mg/cm$^2$, suitably about 0.5 to about 5 mg/cm$^2$, or about 1 to about 2 mg/cm$^2$.

The superabsorbent polymer can be crosslinked or partially crosslinked to optimize its contribution to the absorption properties of the hydrophilic membrane. Crosslinking can be accomplished using a suitable crosslinking agent, and can occur before or after (suitably after) the superabsorbent polymer is applied to the hydrophilic base material. A wide variety of known crosslinking agents may be employed, including without limitation methylene bisacrylamides; monofunctional aldehydes; 1,4-butanedioldiacrylate; ammonium persulfate; polyols; functionalized polyvinyl alcohols; alkylene carbonates; oxazolidone compounds; and the like. Crosslinking can be initiated using heat, radiation, and other known techniques. In one embodiment, the crosslinking is performed by heat treating the superabsorbent-coated hydrophilic base material at 80° C. in an oven for one hour, followed by pressing the superabsorbent-coated hydrophilic base material at 80° C. for 5 min and 10,000 psi, using the crosslinking agent. The amount of crosslinking agent may vary, and can range from about 2% to about 40% based on the weight of the superabsorbent polymer, suitably about 10% to about 30% based on the weight of the superabsorbent polymer.

The hydrophilic membrane 24 can be supported by a porous screen, netting, or other suitable porous material (not shown) to preserve the integrity of the hydrophilic membrane 24 without compromising its ability to desorb water from its lower surface 25. The type and thickness of the porous support material may vary depending upon the weight, thickness and area of the hydrophilic membrane 24, as well as its structural integrity.

Figure 2:
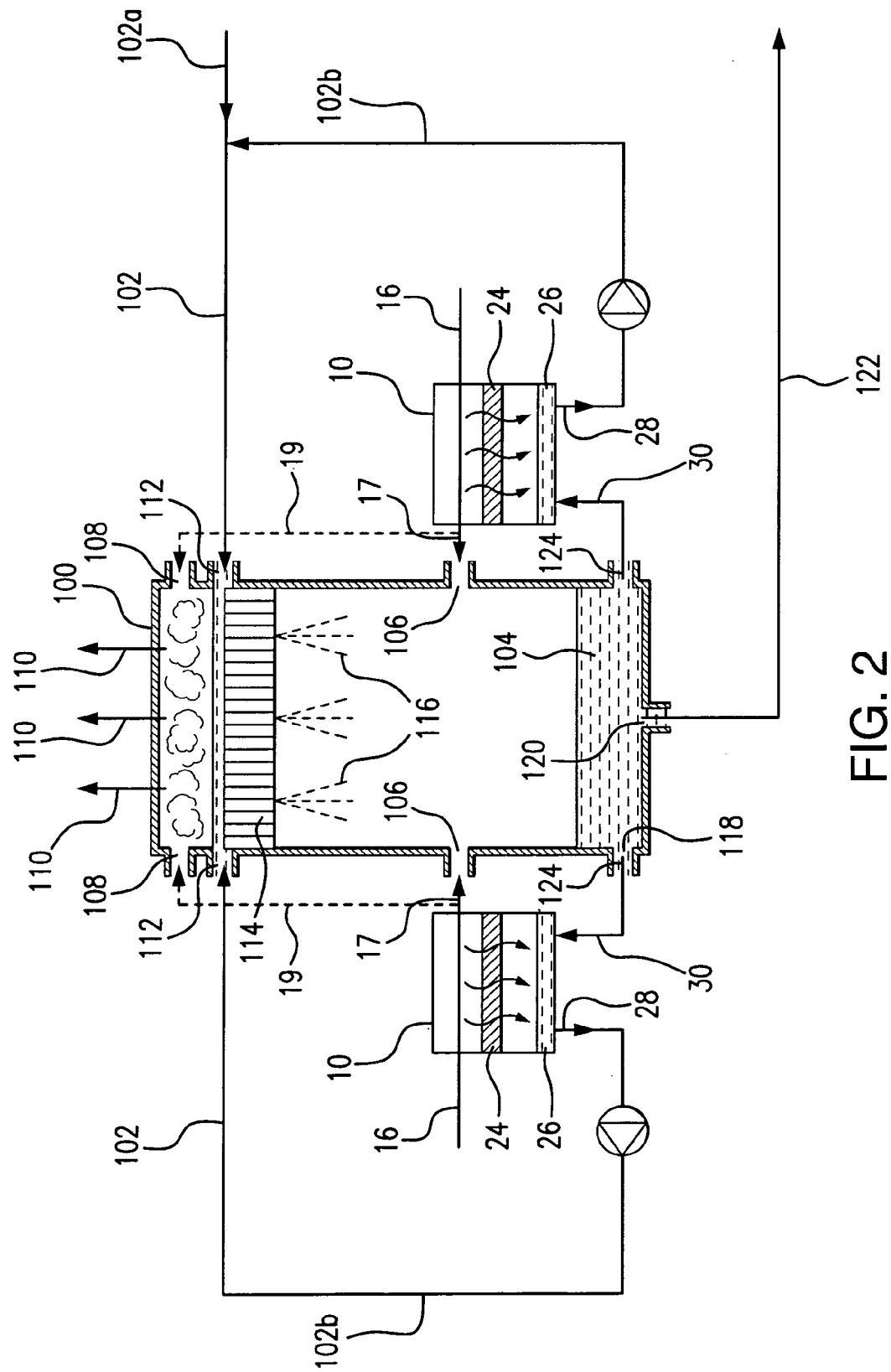
FIG. 2 schematically illustrates a sub-dew point cooling tower that embodies the apparatus for dehumidifying gas.

FIG. 2 illustrates a sub-dew point cooling tower 100 which, in the embodiment shown, utilizes two of the apparatus 10 for dehumidifying gas. A cooling tower is intended for reducing the temperature of a water stream by transferring heat from the water to the atmosphere. The heat is transferred to the atmosphere by convective and evaporative heat transfer between water on the one hand, and air, flue gas or exhaust gas on the other hand. The main purpose of a cooling tower is to conserve water by using it as a recirculating coolant. Common applications for cooling towers include providing cooling for electric power generation, manufacturing, air conditioning. Often, the limiting factor of efficient operation and performance is temperature of water from the cooling tower. Alternatively, in power generation and building cooling, the hotter condensate return results in a greater energy penalty, reducing a cost-effectiveness of the plant operation. As such, colder water provided by the cooling tower reduces energy consumption to power turbines, compressors, water chillers, absorption machines, and other generating and process equipment, increasing heat transfer efficiency at lower cost. Greater cycle efficiency implies reduced water and fuel usage.

The main objective of the sub-dew point cooling tower (FIG. 2) is to utilize the apparatus 10 for dehumidifying gas to deliver counter-flow cooled water at temperatures either a) at or below ambient wet bulb temperature of the humid gas (air/flue gas, etc.) stream entering the apparatus 10, or b) below ambient dew point temperatures while achieving plume abatement. The sub-dew point cooling tower accomplishes these objectives by increasing the evaporative cooling potential of ambient air by dehumidifying the incoming gas streams 16 to depress their dew point temperatures. This increases the cooling potential of the dehumidified gas streams 17 as they enter the cooling tower 100 by also depressing their ambient wet bulb temperatures. This permits cooling of the incoming warm water stream 102 in the cooling tower 100 to below the wet bulb temperature, or even below the dew point temperature of the incoming gas streams 16 depending on ambient conditions and how aggressively the gas streams 16 are dehumidified.

It is advantageous to not only dehumidify, but also to cool each dehumidified gas stream 16 before it enters the cooling tower 100. In the embodiment of FIG. 2, this is accomplished by diverting some of the cooled water 104 from the cooling tower back into the water basin 26 of each apparatus 10, via an inlet water stream 30 extending from the cooling tower 100 to each apparatus 10. The cooled water in the basin 26 provides a heat sink for cooling the interior of the enclosure 12, including the hydrophilic membrane 24 and the gas streams 16, 17 passing across it. The cooled dehumidified gas enters the cooling tower 100 via the inlets 106 in its lower half. Optionally, some of the cooled, dehumidified gas can be diverted via streams 19 to enter the cooling tower 100 via the inlets 108 near its top.

The cooled dehumidified gas passes through the cooling tower 100 and exits via exhaust streams 110 located at the top of cooling tower 100. The counter flow stream 102 of warm water enters near the top of cooling tower 100 through water inlets 112. The stream 102 of warm water includes a first sub-stream 102a of water from an original source and a second sub-stream 102b of water exiting the apparatus 10 via streams 28, the sub-streams converging into stream 102 before entering the cooling tower. After entering the cooling tower 100, the counter-flow water stream 102 passes through a heat exchanger 114, is cooled by the cooled, dehumidified air from inlets 106 and is dispensed into a spray 116 that is further cooled as the spray falls and is collected as cooled water 104 in water basin 118. The heat exchanger 114 separates the cooled dehumidified gas from the counter flow stream of water and provides flow paths for the dehumidified gas and water through the heat exchanger, enabling cooling of the counter-flow stream of water using the dehumidified gas. An exhaust fan (not shown) can be provided near the top of cooling tower 100 for controlling the flow rate of the dehumidified gas. Part of the cooled water from water basin 118 exits thorough outlet 120 as product stream 122. Part of the cooled water exits through outlet 124 and is directed back into the apparatus 10 via streams 30 to aid in cooling the hydrophilic membranes 24 and the gas stream 16, 17.

In order to derive optimum cooling performance from the dehumidified gas streams 17 entering the cooling tower 100, it is desirable to cool the gas streams 17 to just above their dew point, and below the dew point and wet bulb temperature of the humid gas streams 16. This cooling can be accomplished by directing some of the cooled water 104 from basin 118 into the apparatus 10 as described above. Additionally, the dehumidified gas streams 17 can be further cooled using heat exchangers and other devices (not shown), either with the aid of cooled water 104 or other cooling fluids.

Another objective of the sub-dew point cooling tower (FIG. 2) is to utilize the apparatus 10 for producing water from humid gas thus reducing or eliminating make-up water for cooling tower and essentially reducing water consumption.

Figure 3:
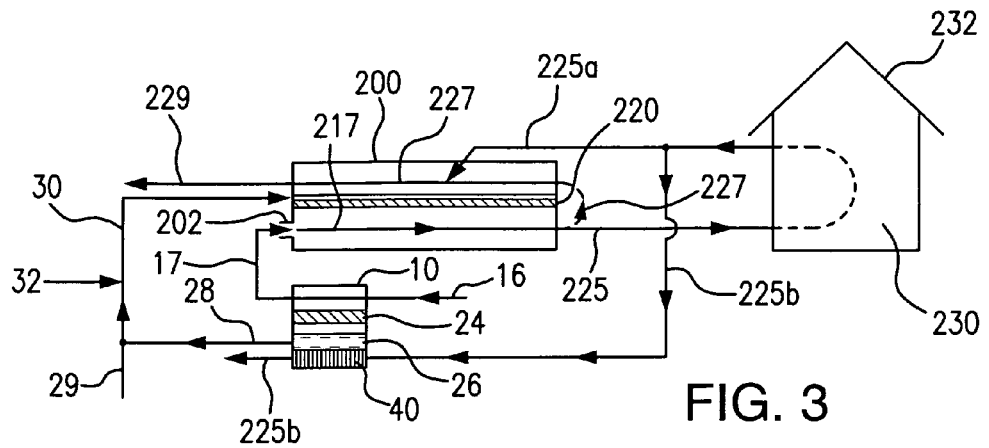
FIG. 3 schematically illustrates a first embodiment of a sub-dew point evaporative cooler that embodies the apparatus for dehumidifying gas.
Figure 4:
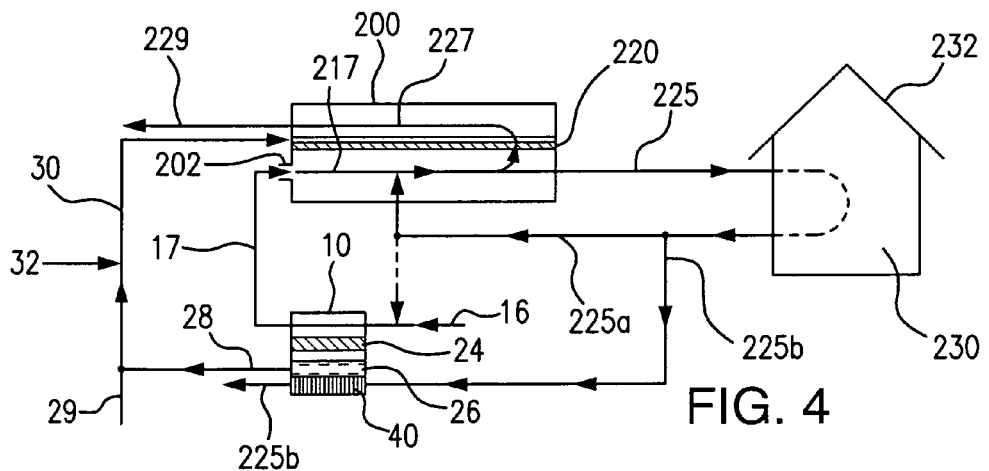
FIG. 4 schematically illustrates a second embodiment of a sub-dew point evaporative cooler that embodies the apparatus for dehumidifying gas.
Figure 5:
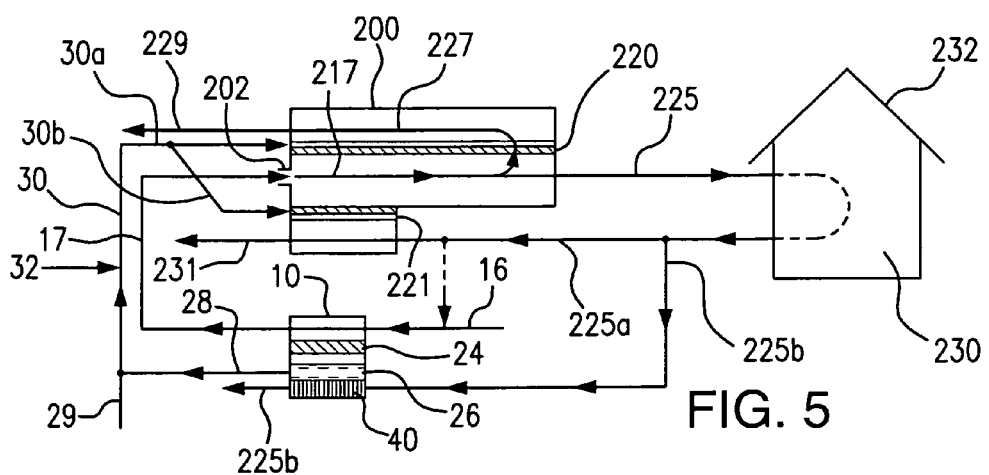
FIG. 5 schematically illustrates a third embodiment of a sub-dew point evaporative cooler that embodies the apparatus for dehumidifying gas.

FIGS. 3-5 illustrate first, second and third embodiments of a sub-dew point evaporative cooler 200 that utilize the apparatus 10 for dehumidifying gas. In addition to apparatus 10, the sub-dew point evaporative cooler 200 includes an evaporative cooler inlet 202 for receiving the dehumidified gas from the apparatus 10, an evaporative cooler membrane 220 having an upper wet surface and a lower dry surface, a first flow path 217 for passing the dehumidified gas across the dry surface and a second flow path 227 for passing at least a portion of the dehumidified gas across the wet surface. The stream 17 of dehumidified gas leaves the apparatus 10 and enters the evaporative cooler 200 through an inlet 202, and pushes through evaporative cooler 200 along a flow path shown as stream 217 across the lower (dry) surface of evaporative cooler membrane 220 that extends the length of evaporative cooler 200 and bisects the evaporative cooler 200 into upper and lower sections. Water from the water basin 26 of apparatus 10 exits via water stream 28 which converges with a stream 29 of make-up water (if required) to form a combined water stream 30. The water stream 30 can be heated using a heat source 32 to facilitate subsequent evaporation. The water stream 30 then enters the evaporative cooler 200 above the internal membrane 220 and wets the upper surface of internal membrane 220. The stream 217 of dehumidified gas, after passing across the lower dry surface of membrane 220, splits into an upper stream 227 and a lower stream 225. The upper stream 227 of dehumidified gas passes around the membrane 220 and across the wet upper surface in a direction opposite the movement of water 230.

As the upper stream 227 of dehumidified gas passes across the wet upper surface of membrane 220, it evaporates water from the surface, resulting in evaporative cooling of the membrane 220, and humidification of the gas stream 227 to form a humidified gas stream 229, which exits the evaporative cooler 200 as exhaust. This cooling of the membrane 220 further cools the dehumidified gas stream 217 as it passes across the lower dry surface. The lower stream 225 from the cooled, dehumidified gas stream 227 passes through an internal space 230 of a building 232 and cools the internal space. The dehumidified gas stream 225 then leaves the internal space 230 and splits into two streams 225a and 225b. Stream 225a re-enters the evaporative cooler 200, and re-converges with the gas stream 227 above the wet surface of the internal membrane 220 before exiting as part of exhaust stream 229. Stream 225b is an exhaust stream which can be used to cool the water in basin 26 as explained below.

The internal membrane 220 suitably has an upper hydrophilic layer defining the wet upper surface and a lower hydrophobic layer defining the dry lower surface. The upper hydrophilic layer can include a base layer and a superabsorbent polymer as described above for the internal hydrophilic membrane 24 of the apparatus 10, and using any of the above-described materials. The upper hydrophilic layer wicks water supplied from the water stream 30 across the internal membrane 220. The rate and efficiency of wicking are determined by the hydrophilic materials and are aided by the superabsorbent polymer. The lower hydrophobic layer keeps the lower surface for the internal membrane 220 dry. The hydrophobic layer can be formed of a wide variety of materials, including without limitation polypropylene and polyethylene homopolymers and copolymers, polytetrafluoroethylenes, polyesters, polycarbonates, titanium foam, nickel foam and combinations thereof.

The apparatus 10 in FIG. 3 can be equipped with a heat exchanger 40 which cools the water in basin 26. This in turn cools the interior of the apparatus 10 to increase its dehumidification rate. The coolant for the heat exchanger 40 can be provided by routing exhaust stream 225b through the heat exchanger 40 as shown. Alternatively or additionally, a vacuum generating device may be provided below the second surface 25 of membrane 24 to create a positive vapor pressure gradient resulting in a decrease in vapor pressure between the first surface 23 and the second surface 25 of membrane 24. Alternatively or additionally, a circulating liquid desiccant may be provided below the second surface 25 of membrane 24 to create a positive vapor pressure gradient resulting in a decrease in vapor pressure between the first surface 23 and the second surface 25 of membrane 24.

FIG. 4 illustrates a second embodiment of a sub-dew point evaporative cooler 201. In the embodiment of FIG. 4, as in FIG. 3, the stream 217 of dehumidified gas passes along the lower dry surface of internal membrane 220 and then splits into an upper stream 227 and a lower stream 225. The upper stream 227 traverses the membrane 220 and passes across the wet upper surface of the membrane 220 in a direction opposite the water stream 30. This causes evaporation of the water from the membrane 220, humidification of the gas stream 227, and evaporative cooling of the membrane 220. The humidified gas exits the evaporative cooler as exhaust stream 229.

The stream 217 of dehumidified gas cools as it passes across the dry lower surface of the evaporatively cooled membrane 220. The lower stream 225 carries the cooled dehumidified gas into the internal space 230 of building 232, causing cooling of the internal space. After leaving the internal space 230, instead of joining the stream 227, the stream 225 of dehumidified gas splits into a first stream 225a that recycles back to the dry lower surface of membrane 220 and a second stream 225b which is an exhaust stream. If the recycled gas stream 225a requires dehumidification as well as cooling, then it may alternatively be diverted to the humid gas stream 16 entering the apparatus 10 for dehumidifying gas, and may be dehumidified before re-entering the sub-dew point evaporative cooler 201. The exhaust stream 225b is channeled through the heat exchanger 40 of apparatus 10 and cools the water in basin 26, in turn cooling the apparatus 10 to increase its dehumidification rate as described above.

Except as described above, the sub-dew point evaporative cooler 201 of FIG. 4 is similar to the sub-dew point evaporative cooler 200 of FIG. 3. The sub-dew point evaporative cooler 202 of FIG. 5 offers a further modification wherein a second internal membrane 221 having a dry hydrophobic upper surface and a wet hydrophilic lower surface is positioned below the first internal membrane 220, such that the dehumidified gas stream 217 passes between the membranes 220 and 221 for a more efficient cooling. The water stream 30 splits into an upper water steam 30a feeding the wet upper surface of membrane 220 and a lower water stream 30b feeding the wet lower surface of membrane 221.

The dehumidified gas stream 217 is cooled to yield cooled dehumidified gas stream 225, which cools the internal space 230 of building 232. After leaving the internal space 230, the gas stream 225 splits into a first stream 225a and a second (exhaust) stream 225b. The gas stream 225a passes across the wet lower surface of the second internal membrane 221, resulting in evaporation of water and evaporative cooling of the second internal membrane 221, and is then exhausted as gas stream 231. Alternatively, some of the gas stream 225a may be diverted to the humid gas stream 16 entering the apparatus 10 for dehumidifying gas, and may be dehumidified before re-entering the sub-dew point evaporative cooler 202 as part of dehumidified gas stream 217. The exhaust stream 225b is channeled through the heat exchanger 40 of apparatus 10 and cools the water in basin 26, in turn cooling the apparatus 10 to increase its dehumidification rate as described above. Alternatively or additionally, a vacuum circulating device and/or circulating liquid desiccant as described with respect to FIG. 4 may be provided to create a positive vapor pressure gradient resulting in a decrease in vapor pressure between the first surface 23 and the second surface 25 of membrane 24.

The use of apparatus 10 for dehumidifying gas in each of the evaporative coolers of FIGS. 3-5 enables the dehumidified gas streams 17 and 217, and hence the cooled dehumidified gas stream 225, to have dew points and wet bulb temperatures below the dew point and wet bulb temperature of the humid gas stream 16. This in turn enables the cooled dehumidified gas stream 225 to have an actual temperature below the dew point and wet bulb temperature of the humid gas stream 16, thus enabling greater and more efficient cooling of the internal space 230.

Figure 6:
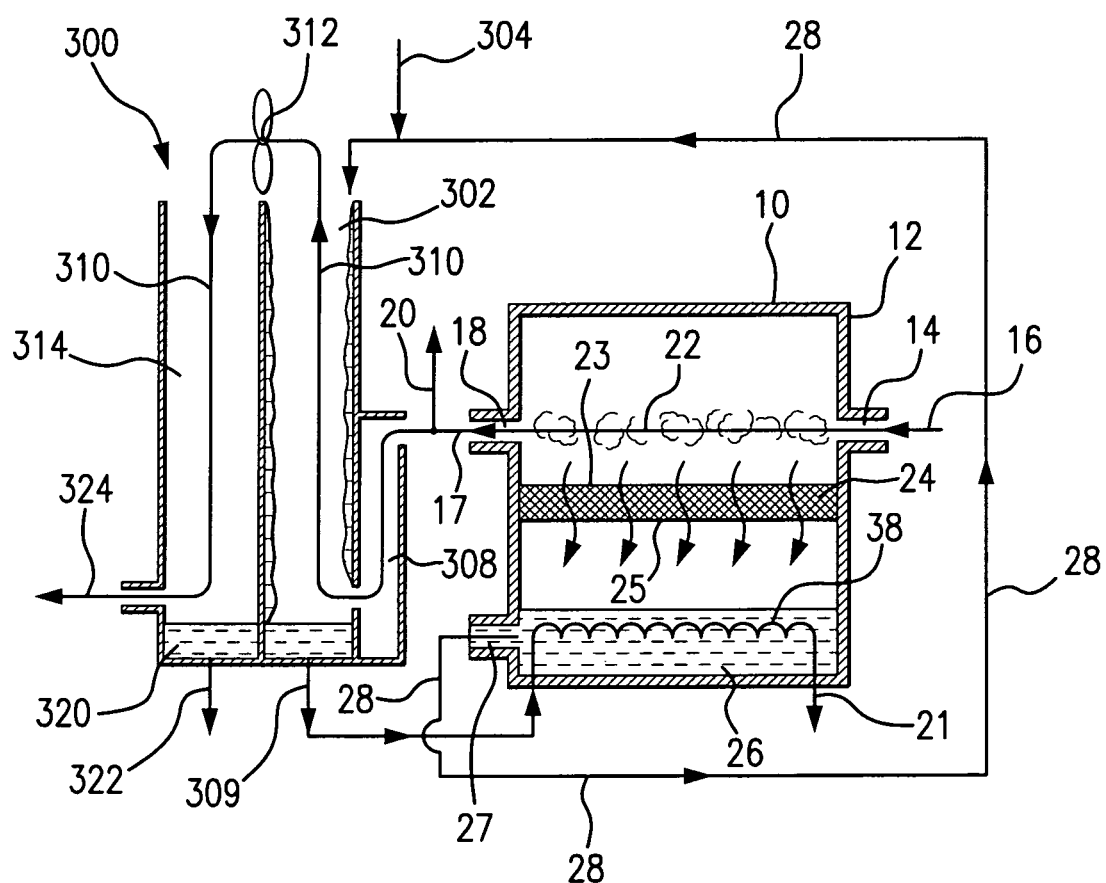
FIG. 6 schematically illustrates a sub-dew point membrane water harvesting system that embodies the apparatus for dehumidifying gas.

FIG. 6 illustrates a sub-dew point membrane water harvesting system 300 that utilizes the apparatus 10 for dehumidifying gas. The water harvesting system utilizes both the dehumidified gas (air) stream 17 and the water from the water basin 26 to yield potable water. Water from basin 26 exits apparatus 10 through outlet 27 and follows a water flow path 28 that carries the water to an evaporation channel 302. Before entering evaporation channel 302, the water can be heated from a heat source 304. The water enters the evaporation channel 304 from the top, and flows downward as shown.

Dehumidified gas (air) leaves the apparatus 10 via dehumidified gas stream 17 and outlet 18. Some of the dehumidified air is diverted to exhaust stream 20. The remainder of the dehumidified air enters the evaporation channel 302 at its bottom, via inlet channel 308, and flows upward in the evaporation channel 302 along flow path 310, against the flow if incoming water. The flow path 310 can be driven with the aid of a suction blower 312 or another suitable device.

The dehumidified air evaporates considerable water along the flow path 310 through evaporation channel 302, and becomes humidified and saturated. Excess water is discharged through outlet stream 309 at the bottom of evaporation channel 302 and is recirculated to the water basin 26 of apparatus 10, suitably via heat exchanger 38, to cool the water in water basin 26 relative to the humid gas stream 16 before being ultimately discharged at stream 21. This is beneficial because water vapor on the lower side of membrane 24 will be saturated at steady state, and will generally have a higher partial pressure than the humid gas in the flow path 22. The membrane 24 can thus have a positive pressure gradient between its upper surface 23 and lower surface 25 provided that the apparatus 10 is primed with non-saturated air above the membrane 24 and/or colder water in the basin 26 so that the vapor pressure decreases across the membrane 24. The coldest part of the cycle exists near the bottom of evaporation channel 302 where the dehumidified gas stream 17 has been humidified to its wet bulb temperature. As the humid inlet gas stream 16 is dehumidifies across flow path 22 to the dehumidified gas stream 17, the evaporative cooling potential near the bottom of channel 302 decreases further, driving the cold water discharge temperature at 309 down, further cooling the water in basin 26, further reducing the saturated partial pressure of vapor below the membrane 24, further driving dehumidification across the membrane 24, further reducing the exiting wet bulb temperature of stream 17, and so on until the system limits of the virtuous cycle are realized.

The saturated air from evaporation channel 302 then passes downward through condensation channel 314 along flow path 10, where it is cooled, resulting in condensation of water The condensed, potable water 320 collects in the bottom of condensation channel 314 and can be discharged through potable water outlet stream 322. The spent air is then discharged just above the collected potable water 320, through exhaust stream 324.

The sub-dew point membrane water harvesting system is highly efficient because the dehumidified air stream 17 has a lower dew point and higher evaporation capacity than the inlet humid air stream 16. This enables more rapid evaporation of water, and greater evaporating of water in the evaporative channel 302.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

We claim:

1. An apparatus for dehumidifying gas, comprising:
   an inlet for receiving humid gas;
   an internal hydrophilic membrane including a superabsorbent polymer;
   a flow path for passing the humid gas across the internal hydrophilic membrane, wherein the membrane absorbs moisture from the humid gas to yield dehumidified gas; and
   an outlet for the dehumidified gas;
   wherein the membrane absorbs moisture from a first surface and releases water from a second surface upon achieving a steady state absorption/desorption rate; and
   the apparatus further comprises a water basin for temporarily storing water that is released from the second surface and an outlet for water from the basin, and a heat exchanger for cooling the water in the basin, the cooled water in the basin providing a positive vapor pressure gradient resulting in a decrease in vapor pressure between the first surface and the second surface of the membrane.

2. The apparatus of claim 1, further comprising a vacuum generating device for providing a positive vapor pressure gradient resulting in a decrease in vapor pressure between the first surface and the second surface of the membrane.

3. The apparatus of claim 1, further comprising a circulating liquid desiccant for providing a positive pressure gradient resulting in a decrease in vapor pressure between the first surface and the second surface of the membrane.

4. The apparatus of claim 1, wherein the superabsorbent polymer is selected from the group consisting of hydrolyzed acrylonitrile-grafted starch; acrylic acid-grafted starch; methyl cellulose; chitosan; carboxymethyl cellulose; hydroxypropyl cellulose; natural gums; alkali metal and ammonium salts of polyacrylic acid, polymethacrylic acid, polyacrylamides and polyvinyl ethers; hydrolyzed maleic anhydride copolymers with vinyl ethers and alpha-olefins; polyvinyl pyrrolidone; polyvinyl morpholinone; polyvinyl alcohol; chloride and hydroxide salts of polyvinyl amine; polyquaternary ammonium polyamine; hydrolyzed polyamide; and combinations of the foregoing with each other and with zeolites.

5. The apparatus of claim 1, wherein the internal hydrophilic membrane comprises a hydrophilic base material upon which the superabsorbent polymer is disposed.

6. The apparatus of claim 5, wherein the hydrophilic base material is selected from the group consisting of Manila paper, filter paper, cotton fabrics, and combinations thereof.

7. The apparatus of claim 5, further comprising a porous support material for the hydrophilic membrane.

8. A sub-dew point cooling tower, comprising an apparatus for dehumidifying gas, the apparatus for dehumidifying gas comprising:
an inlet for receiving humid gas;
an internal hydrophilic membrane including a superabsorbent polymer;
a flow path for passing the humid gas across the internal hydrophilic membrane, wherein the membrane absorbs moisture from the humid gas to yield dehumidified gas; and
an outlet for the dehumidified gas;
the sub-dew point cooling tower further comprising one or more cooling tower inlets for receiving the dehumidified gas, a heat exchanger separating the dehumidified gas from a counter-flow stream, a flow path for the dehumidified gas through the heat exchanger enabling a cooling of the counter-flow stream using the dehumidified gas, and a cooling tower outlet for exhausting at least the dehumidified gas;
wherein water is produced from the humid gas and used in the cooling tower as a recirculating coolant.

9. The sub-dew point cooling tower of claim 8, wherein the counter-flow stream is cooled to a temperature below a wet bulb temperature of the humid gas.

10. The sub-dew point cooling tower of claim 8, further comprising an exhaust fan for controlling the flow rate of the dehumidified gas through the heat exchanger.

11. The sub-dew point cooling tower of claim 8, wherein the counter-flow stream in the cooling tower is a liquid, further comprising a basin for collecting the liquid after it has been cooled.

12. A sub-dew point evaporative cooler comprising an apparatus for dehumidifying gas, the apparatus for dehumidifying gas comprising:
an inlet for receiving humid gas;
an internal hydrophilic membrane including a superabsorbent polymer;
a dehumidifier flow path for passing the humid gas across the internal hydrophilic membrane, wherein the membrane absorbs moisture from the humid gas to yield dehumidified gas; and
an outlet for the dehumidified gas;
the sub-dew point evaporative cooler further comprising an evaporative cooler inlet for receiving the dehumidified gas from the dehumidifying apparatus, an evaporative cooler membrane having a dry surface and a wet surface, a first flow path for passing the dehumidified gas across the dry surface of the evaporative cooler membrane to cool the dehumidified gas, and a second flow path for passing a portion of the dehumidified gas across the wet surface of the evaporative cooler membrane to cause evaporative cooling of the evaporative cooler membrane.

13. The sub-dew point evaporative cooler of claim 12, wherein the cooled dehumidified gas has a temperature below a wet bulb temperature of the humid gas.

14. The sub-dew point evaporative cooler of claim 12, wherein the first flow path carries the cooled dry gas into an inner space for cooling of the inner space.

15. The sub-dew point evaporative cooler of claim 14, wherein the first flow path recycles gas from the inner space to the dry surface of the evaporative cooler membrane for further cooling.

16. The sub-dew point evaporative cooler of claim 14, wherein the first flow path recycles gas from the inner space to the inlet for receiving humid gas for further dehumidification.

17. The sub-dew point evaporative cooler of claim 12, wherein the first flow path at first coincides with, and then diverges from the second flow path.

18. A sub-dew point membrane water harvesting system comprising an apparatus for dehumidifying gas, the apparatus for dehumidifying gas comprising:
an inlet for receiving humid gas;
an internal hydrophilic membrane including a superabsorbent polymer;
a dehumidifier flow path for passing the humid gas across the internal hydrophilic membrane, wherein the membrane absorbs moisture from the humid gas to yield dehumidified gas and water;
a water basin for collecting the water from the internal hydrophilic membrane; and
an outlet for the dehumidified gas;
the water harvesting system further comprising a water evaporation channel, a water condensing channel, and a water harvesting flow path that carries a portion of the dehumidified gas through the water evaporation channel and the condensing channel to yield potable water, and a water flow path to carry water from the water basin to the water evaporation channel.

19. The water harvesting system of claim 18, further comprising a supply of heat to the evaporation channel.

20. The water harvesting system of claim 18, wherein the water harvesting flow path flows upward through the evaporation channel and downward through the condensing channel.

* * * * *